US009975575B2

(12) United States Patent
Nakazawa et al.

(10) Patent No.: US 9,975,575 B2
(45) Date of Patent: May 22, 2018

(54) CRAWLER-TYPE TRAVELING VEHICLE

(71) Applicant: KABUSHIKI KAISHA AICHI CORPORATION, Saitama (JP)

(72) Inventors: Shunichi Nakazawa, Minakami-machi (JP); Hiroaki Mizuguchi, Ageo (JP); Hiroshi Furusho, Minakami-machi (JP); Akira Moriyama, Minakami-machi (JP); Hiroshi Miyamoto, Minakami-machi (JP)

(73) Assignee: KABUSHIKI KAISHA AICHI CORPORATION, Saitama (JP)

( * ) Notice: Subject to any disclaimer, the term of this patent is extended or adjusted under 35 U.S.C. 154(b) by 86 days.

(21) Appl. No.: 14/024,323

(22) Filed: Sep. 11, 2013

(65) Prior Publication Data
US 2014/0093345 A1 Apr. 3, 2014

(30) Foreign Application Priority Data

Sep. 28, 2012 (JP) .................................. 2012-218103

(51) Int. Cl.
 B62D 11/00 (2006.01)
 B62D 11/04 (2006.01)
 (Continued)

(52) U.S. Cl.
 CPC ............... *B62D 11/04* (2013.01); *B66C 9/10* (2013.01); *B66F 11/046* (2013.01); *B66F 17/006* (2013.01)

(58) Field of Classification Search
 CPC ...... B66F 11/046; B66F 17/006; B66F 11/04; B66F 11/042; B66F 11/044; B66F 11/048;
 (Continued)

(56) References Cited

U.S. PATENT DOCUMENTS 4,078,681 A * 3/1978 Field, Jr. ................ B62D 11/18
 414/694
4,354,420 A * 10/1982 Bianchetta ........................ 91/6
 (Continued)

FOREIGN PATENT DOCUMENTS

EP 1016619 A2 7/2000
EP 1253064 A1 10/2002
 (Continued)

OTHER PUBLICATIONS

The partial European search report dated Dec. 17, 2013, which corresponds to European Patent Application No. 13183981.3-1705 and is related to U.S. Appl. No. 14/024,323.
 (Continued)

Primary Examiner — Daniel P Cahn
(74) Attorney, Agent, or Firm — Studebaker & Brackett PC

(57) ABSTRACT

A travel control section 60b is configured to control the revolution velocities of transversely opposite travel motors 51 and 52 such that when turning amount command signals are inputted from a turning amount operation dial 48, transversely opposite crawler travel devices 12a and 12b are caused to realize a turn according to the turning amount command signals by decelerating the traveling velocities of the transversely opposite crawler travel devices 12a and 12b from a target straight traveling velocity set by a travel operation lever 47 by equal values of velocity which are predetermined according to the turning amount command signals inputted from the turning amount operation dial 48 and further decelerating the traveling velocity of the crawler travel device 12a or 12b which is positioned inwardly relative to the other in the turning direction.

4 Claims, 5 Drawing Sheets

(51) Int. Cl.
*B66F 11/04* (2006.01)
*B66F 17/00* (2006.01)
*B66C 9/10* (2006.01)

(58) Field of Classification Search
CPC ........... B66C 9/10; B62D 11/04; B62D 11/00; B62D 11/003; B62D 11/02; E02F 9/22; B60L 3/00; E04H 17/266; E04G 21/3261; E04G 21/3266; E04G 21/3247
See application file for complete search history.

(56) References Cited

U.S. PATENT DOCUMENTS

| | | | |
|---|---|---|---|
| 5,159,989 A * | 11/1992 | Claxton | B60S 9/12 180/41 |
| 5,842,532 A * | 12/1998 | Fox | A61G 5/046 180/24.06 |
| 6,378,635 B1 * | 4/2002 | Yoshida et al. | 180/9.5 |
| 6,378,653 B1 * | 4/2002 | Takahashi | B66F 11/046 182/62.5 |
| 6,595,330 B1 * | 7/2003 | Henrickson et al. | 187/277 |
| 8,056,674 B2 | 11/2011 | Bean et al. | 182/2.9 |
| 8,768,579 B2 * | 7/2014 | Taylor | E02F 3/437 414/694 |
| 9,868,624 B2 * | 1/2018 | Ahern | F04B 17/03 |
| 2003/0136591 A1 | 7/2003 | Kitasaka | |
| 2005/0230158 A1 * | 10/2005 | Kanke et al. | 180/6.5 |
| 2005/0246082 A1 * | 11/2005 | Miki et al. | 701/50 |
| 2007/0084646 A1 * | 4/2007 | Scruggs | B62D 11/006 180/6.2 |
| 2008/0097666 A1 * | 4/2008 | Oba | B66F 9/07568 701/41 |
| 2008/0103638 A1 * | 5/2008 | Young | B62D 11/003 701/1 |
| 2009/0036264 A1 * | 2/2009 | Tozawa et al. | 477/5 |
| 2009/0038186 A1 * | 2/2009 | Osswald | B62D 21/14 37/413 |
| 2009/0206589 A1 * | 8/2009 | Osswald | B62D 21/14 280/782 |
| 2010/0021234 A1 * | 1/2010 | Willis | B62D 7/026 404/90 |
| 2010/0106373 A1 * | 4/2010 | Scheer | B62D 11/003 701/41 |
| 2010/0162706 A1 * | 7/2010 | Sakai et al. | 60/706 |
| 2010/0302017 A1 * | 12/2010 | Guglielmo | G05G 9/047 340/407.2 |
| 2011/0060488 A1 * | 3/2011 | Nakazawa | B66F 9/20 701/22 |
| 2011/0196585 A1 * | 8/2011 | Ishibashi et al. | 701/51 |
| 2012/0160796 A1 * | 6/2012 | Weckbecker | B66C 13/28 212/284 |
| 2013/0311052 A1 * | 11/2013 | Edamura et al. | 701/50 |
| 2014/0032006 A1 * | 1/2014 | Tojima et al. | 700/295 |
| 2014/0283509 A1 * | 9/2014 | Hijikata | 60/414 |
| 2015/0176253 A1 * | 6/2015 | Taylor | E02F 3/3414 701/50 |
| 2015/0246684 A1 * | 9/2015 | Ahern | B62D 5/0457 701/41 |
| 2015/0259185 A1 * | 9/2015 | Ditty | B66F 17/006 182/19 |
| 2015/0274160 A1 * | 10/2015 | Lee | B62D 6/002 701/41 |
| 2017/0081162 A1 * | 3/2017 | Ahern | B66F 11/042 |
| 2017/0217745 A1 * | 8/2017 | Artoni | B62D 21/00 |
| 2017/0284426 A1 * | 10/2017 | Nomura | F15B 13/01 |

FOREIGN PATENT DOCUMENTS

| | | | | |
|---|---|---|---|---|
| JP | 05-024481 A | | 2/1993 | |
| JP | 07101698 A | * | 4/1995 | ........... B66F 17/006 |
| JP | 2000-247600 A | | 9/2000 | |
| JP | 2001-055157 A | | 2/2001 | |
| JP | 2002-104227 A | | 4/2002 | |
| JP | 2003-048692 A | | 2/2003 | |
| JP | 2003048692 A | * | 2/2003 | |
| JP | 2003-063794 A | | 3/2003 | |
| JP | 2003-343510 A | | 12/2003 | |
| JP | 2010-083434 A | | 4/2010 | |

OTHER PUBLICATIONS

An Office Action; "Notice of Reasons for Rejection," issued by the Japanese Patent Office dated Jun. 28, 2016, which corresponds to Japanese Patent Application No. 2012-218103 and is related to U.S. Appl. No. 14/024,323.

* cited by examiner

CRAWLER-TYPE TRAVELING VEHICLE

RELATED APPLICATIONS

This invention claims the benefit of Japanese Patent Application No. 2012-218103 which is hereby incorporated by reference.

TECHNICAL FIELD

The present invention relates to a crawler-type traveling vehicle capable of traveling by means of crawler travel devices provided on transversely opposite sides of a vehicle body.

TECHNICAL BACKGROUND

A known one of such crawler-type traveling vehicles is designed to be capable of a forward and backward straight travel, a slalom turn, a pivot turn and a spin turn by controlling the revolving directions and velocities of the transversely opposite crawler travel devices in accordance with the directions and amounts of operation on transversely opposite two travel operation levers (see Japanese Laid-Open Patent Publication No. 2003-343510(A) for example). Another known crawler-type traveling vehicle includes, instead of the transversely opposite two travel operation levers, a travel operation device having a travel lever for switching between a forward travel and a backward travel, an accelerator pedal for setting a traveling velocity, and a steering wheel for setting a turning direction and a turning amount (see Japanese Laid-Open Utility Model Publication No. H5-24481(A) for example). Yet another known crawler-type traveling vehicle includes a joystick-type travel operation device which is capable of setting a forward travel, a backward travel, a traveling velocity, a turning direction and a turning amount by means of a single travel operation lever (see Japanese Laid-Open Patent Publication No. 2002-104227(A) for example).

SUMMARY OF THE INVENTION

Such a conventional crawler-type traveling vehicle is configured to perform a drive control over the transversely opposite crawler travel devices such that when the travel operation device is operated to cause a turn, the turn set by the travel operation device is realized by decelerating only that crawler travel device which is positioned inwardly relative to the other in the turning direction. Such a turn control has a problem that when the travel operation device is operated to cause a turn during a straight travel for example, an excessive inertial force (centrifugal force) is sometimes exerted on the vehicle and rider in accordance with the current traveling velocity and the amount of a turning operation and, hence, the traveling stability of the vehicle and the ride quality felt by the rider are unfavorable in such cases.

The present invention has been made with such a problem in view. An object of the present invention is to provide a crawler-type traveling vehicle which is capable of improving the traveling stability of the vehicle during turning and the ride quality felt by the rider during turning.

In order to solve the problem mentioned above, a crawler-type traveling vehicle according to a first aspect of the present invention includes: a vehicle body (for example a travel member frame 11 according to an embodiment); transversely opposite crawler travel devices provided on transversely opposite sides of the vehicle body; transversely opposite travel motors which respectively drive the transversely opposite crawler travel devices; a travel operation device (including for example a travel operation lever 47 and a turning amount operation dial 48 according to the embodiment) which sets a traveling direction, a traveling velocity (speed), a turning direction and a turning amount in accordance with a direction and an amount of operation thereon; and a travel control device (for example a travel control section 60b of a controller 60 according to the embodiment) which controls a direction and a velocity of revolution of each of the transversely opposite travel motors in accordance with the traveling direction, the traveling velocity, the turning direction and the turning amount set by the travel operation device. When the travel operation device is operated to cause a straight travel, the travel control device performs a control such that the transversely opposite travel motors are caused to revolve for realizing the straight travel in a direction and at a velocity corresponding to the direction and the amount of operation on the travel operation device. When the travel operation device is operated to cause a turn, the travel control device performs a control such that the transversely opposite travel motors are caused to revolve for realizing the turn set by the travel operation device by decelerating the traveling velocities of the transversely opposite crawler travel devices from traveling velocities of the transversely opposite crawler travel devices traveling straight by equal values of velocity corresponding to the turning amount set by the travel operation device and further decelerating the traveling velocity of the crawler travel device which is positioned inwardly relative to the other crawler travel device in the turning direction.

Preferably, the crawler-type traveling vehicle of the construction described above further includes: a lifting device (for example a boom 30 according to the embodiment) which is mounted on the vehicle body and which moves a workbench up and down at least; and workbench position detecting means (including for example a derricking angle detector 81 and a length detector 82 according to the embodiment) which detects a position of the workbench relative to the vehicle body, wherein when the travel operation device is operated to cause the straight travel, the travel control device performs a control such that the transversely opposite travel motors are caused to revolve for realizing the straight travel at a lower velocity than the traveling velocity corresponding to the amount of operation on the travel operation device in accordance with a vertical distance between the workbench and the vehicle body detected by the workbench position detecting means. Preferably, when the travel operation device is operated to cause the turn, the travel control device performs a control such that amounts of deceleration of the traveling velocities of the transversely opposite crawler travel devices from the traveling velocity of the straight travel become larger in accordance with a vertical distance between the workbench and the vehicle body detected by the workbench position detecting means.

Preferably, the crawler-type traveling vehicle of the construction described above further includes: a lifting device which includes a boom mounted on the vehicle body and capable of derricking (swinging upwardly and downwardly), telescoping (extending and contracting), and rotating and which moves up and down a workbench attached to a distal end portion of the boom; and workbench position detecting means (including for example a derricking angle detector 81 and a length detector 82 according to the embodiment) which detects a position of the workbench relative to the vehicle body, wherein when the travel operation device is operated to cause the turn, the travel control device performs a control such that amounts of deceleration of the traveling velocities of the transversely opposite crawler travel devices from the traveling velocity of the straight travel become larger in accordance with a horizontal distance between the workbench and the vehicle body detected by the workbench position detecting means.

A crawler-type traveling vehicle according to a second aspect of the present invention includes: a vehicle body; transversely opposite crawler travel devices provided on transversely opposite sides of the vehicle body; transversely opposite electric travel motors which respectively drive the transversely opposite crawler travel devices when supplied with electric power; a travel operation device which sets a traveling direction, a traveling velocity, a turning direction and a turning amount in accordance with a direction and an amount of operation thereon; and a travel control device which controls a direction and a velocity of revolution of each of the transversely opposite electric travel motors in accordance with the traveling direction, the traveling velocity, the turning direction and the turning amount set by the travel operation device. The transversely opposite electric travel motors have a function of generating electric power when driven to revolve. When a turn is performed under a revolution control over the transversely opposite electric travel motors by the travel control device for realizing the turn set by the travel operation device, a driving force that is produced when that crawler travel device which is positioned inwardly relative to the other crawler travel device in the turning direction is driven by that crawler travel device which is positioned outwardly relative to the other crawler travel device in the turning direction is utilized to generate electric power by that electric travel motor which drives the inwardly positioned crawler travel device.

The crawler-type traveling vehicle according to the present invention is configured such that when the travel operation device is operated to cause the turn, the revolution control is performed over the transversely opposite travel motors to realize the turn set by the travel operation device by decelerating the transversely opposite crawler travel devices from the traveling velocities of the transversely opposite travel devices traveling straight by equal values of velocity corresponding to the turning amount set by the travel operation device and further decelerating that crawler travel device which is positioned inwardly relative to the other crawler travel device in the turning direction. The traveling vehicle thus configured can reduce the inertial force (centrifugal force) to be exerted on the vehicle and rider to a small value though the velocity during turning is lower than that under the conventional travel control which realizes a turn by decelerating only the inwardly positioned crawler travel device. Therefore, the traveling stability of the vehicle during turning and the ride quality felt by the rider during turning can be improved.

In the crawler-type traveling vehicle, the revolution control is performed over the transversely opposite travel motors to realize the straight travel at a lower velocity than the traveling velocity corresponding to the amount of operation on the travel operation device in accordance with the vertical distance between the workbench and the vehicle body. Since the traveling stability of the vehicle traveling straight lowers as the workbench becomes more separated upwardly from the vehicle body, the feature described above can improve the traveling stability of the vehicle during straight travel. When the crawler-type traveling vehicle is configured to perform the control such that the amounts of deceleration of the transversely opposite crawler travel devices from the traveling velocity of the straight travel become larger in accordance with the vertical distance between the workbench and the vehicle body, the traveling stability of the vehicle during turning can be improved.

In the crawler-type traveling vehicle, the control is performed such that the amounts of deceleration of the transversely opposite crawler travel devices from the traveling velocity of the straight travel become larger in accordance with the horizontal distance between the workbench and the vehicle body. Since a larger inertial force is exerted on the workbench during turning as the workbench becomes more separated horizontally from the vehicle body, the feature described above can prevent the rider on the workbench from being subjected to an excessive inertial force during turning, thereby improving the safety of the rider on the workbench.

The crawler-type traveling vehicle according to the present invention is configured such that: the transversely opposite travel motors each is an electric motor and the transversely opposite electric travel motors have the function of generating electric power when driven to revolve; and when the turn is performed under the revolution control over the transversely opposite electric motors for realizing the turn set by the travel operation device, the driving force that is produced when that crawler travel device which is positioned inwardly relative to the other crawler travel device in the turning direction is driven by that crawler travel device which is positioned outwardly relative to the other crawler travel device in the turning direction is utilized to generate electric power by that electric travel motor which drives the inwardly positioned crawler travel device. The electric power thus generated produces a braking force in the associated electric travel motor, thereby inhibiting the number of revolutions of the inwardly positioned electric travel motor from rising. For this reason, a turn at a predetermined target rudder angle can be realized. Further, the electric power thus generated can charge the battery supplying electric power to the electric travel motors, thereby prolonging the serviceable life of the battery and realizing energy saving.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 4A is a graph obtained when the amount of operation on a travel operation lever is 100%, and FIG. 4B is a graph obtained when the amount of operation on the travel operation lever is 50%;

DESCRIPTION OF THE EMBODIMENTS

Figure 1:
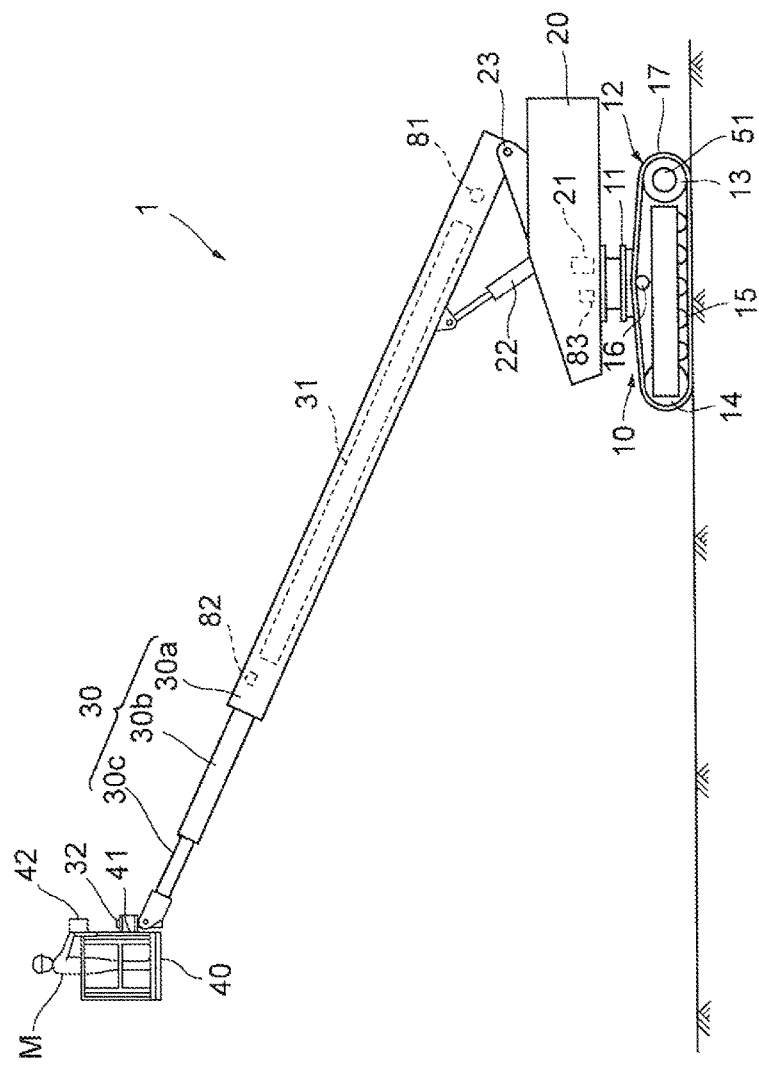
FIG. 1 is a side elevational view illustrating a crawler-type high place work vehicle according to the present invention.

Hereinafter, an embodiment of the present invention will be described with reference to the drawings. FIG. 1 illustrates a crawler-type high place work vehicle 1 as one example of the crawler-type traveling vehicle according to the present invention. The crawler-type high place work vehicle 1 includes a crawler travel member 10, a rotating structure 20 rotatably mounted on an upper portion of the crawler travel member 10, and a boom 30 derrickably mounted on an upper portion of the rotating structure 20.

The crawler travel member 10 includes transversely opposite crawler travel devices 12a and 12b (see FIG. 3) provided on transversely opposite sides of a travel member frame 11. The transversely opposite crawler travel devices 12a and 12b each includes a driver wheel 13 attached to a rear portion of the travel member frame 11, an idler wheel 14 attached to a front portion of the travel member frame 11, a plurality of lower rollers 15 disposed between the driver wheel 13 and the idler wheel 14, a single upper roller 16 disposed between the driver wheel 13 and the idler wheel 14, and a crawler belt 17 entrained about the driver wheel 13, idler wheel 14, lower rollers 15 and upper roller 16.

Figure 2:
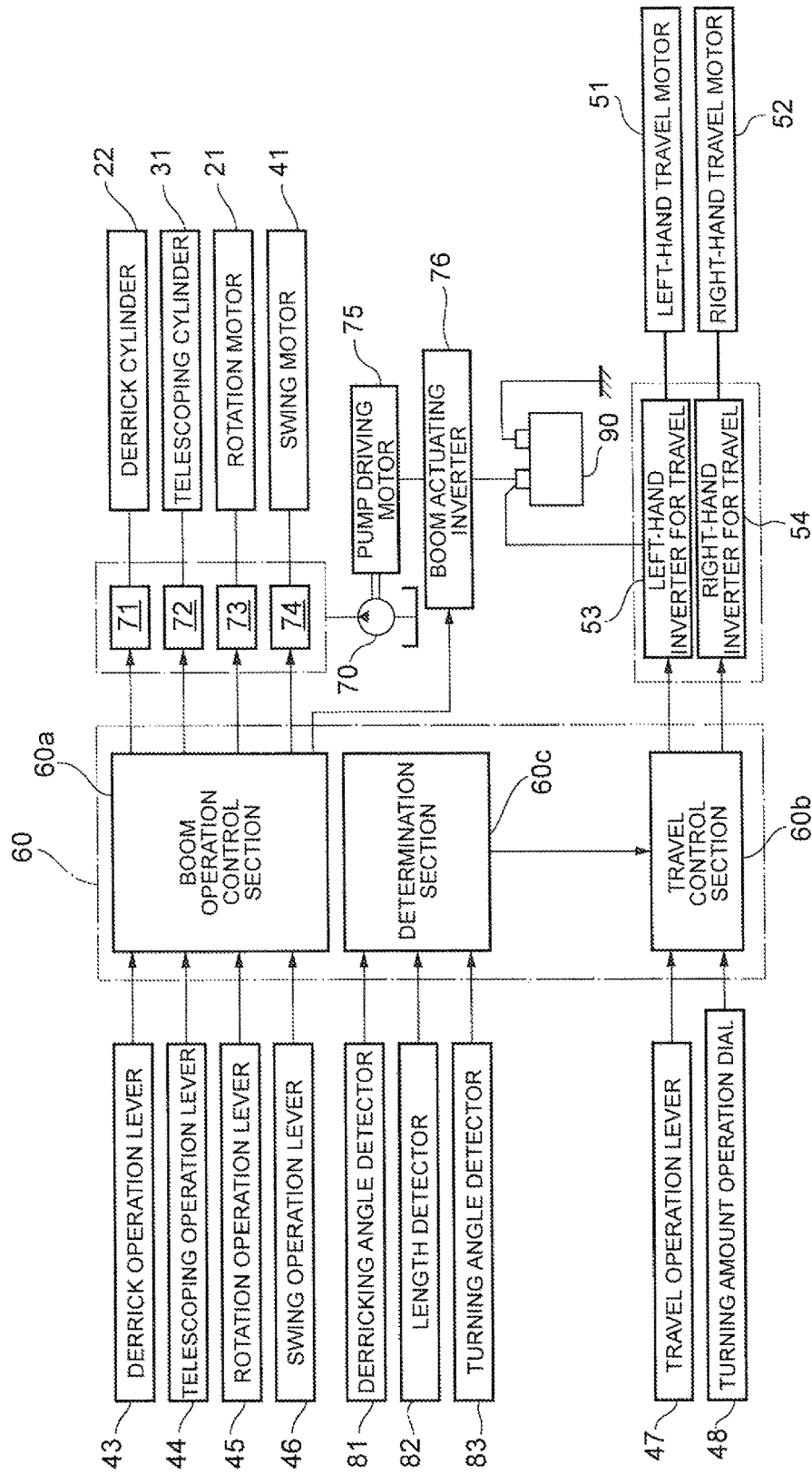
FIG. 2 is a drive system diagram of actuators disposed in the crawler-type high place work vehicle.

The transversely opposite driver wheels 13 are each driven to rotate by transmission of output power of a respective one of transversely opposite travel motors 51 and 52 (see FIG. 3) disposed on the travel member frame 11 through a reduction gear (not shown). As shown in FIG. 2, the transversely opposite travel motors 51 and 52 drive the transversely opposite driver wheels 13 by being driven to revolve by electric power supplied from a battery 90 located inside the rotating structure 20 through respective transversely opposite inverters 53 and 54 for travel. The transversely opposite travel motors 51 and 52 have the function of generating electric power when driven to revolve by the transversely opposite driver wheels 13. The revolving directions and velocities of the transversely opposite motors 51 and 52 are controlled in accordance with the directions and amounts of operation on a travel operation lever 47 and a turning amount operation dial 48 which are provided inside an operating box 42 to be described later.

As shown in FIG. 1, the rotating structure 20 is configured to be capable of rotating within a 360 degree range in a horizontal plane relative to the crawler travel member 10 by causing a rotation motor 21 provided inside the rotating structure 20 to revolve. The boom 30 is derrickably mounted on the upper portion of the rotating structure 20 by means of a foot pin 23.

The boom 30 includes a proximal boom 30a derrickably mounted on the rotating structure 20 by means of the foot pin 23, an intermediate boom 30b and a distal boom 30c which are telescopically combined together. The boom 30 is designed to be capable of wholly telescoping in the longitudinal direction by actuating a telescoping cylinder 31 provided therein. The boom 30 is also designed to be capable of derricking in a vertical plane by expanding and retracting a derrick cylinder 22 spanning between the proximal boom 30a and the rotating structure 20.

A vertical post 32 has a lower end portion attached to a distal end portion of the distal boom 30c by means of a pivot pin. The vertical post 32 is designed to be constantly held in a vertical position irrespective of the derricking angle of the boom 30 by means of a leveling device (not shown) provided inside the boom 30. A workbench (or a working platform) 40 is fitted on an upper portion of the vertical post 32 by means of a workbench retainer bracket (not shown) so as to be swingable in a horizontal plane. The workbench retainer bracket is provided therein with a swing motor 41 which can swing the workbench 40 about the vertical post 32 when actuated to revolve. Since the vertical post 32 is constantly held in the vertical position as described above, the floor surface of the workbench 40 is constantly held in a horizontal position irrespective of the derricking angle of the boom 30.

As shown in FIG. 2, the derrick cylinder 22, telescoping cylinder 31, rotation motor 21 and swing motor 41 are driven to actuate the boom 30, rotating structure 20 and workbench 40 when hydraulic fluid delivered from a hydraulic pump 70 provided inside the rotating structure 20 is supplied thereto through control valves 71 to 74 respectively associated with the cylinders 22 and 31 and motors 21 and 41. The hydraulic pump 70 is driven by a pump driving motor 75. The pump driving motor 75 is driven to revolve by electric power supplied thereto from the battery 90 through a boom actuating inverter 76. The actuating directions and velocities of the derrick cylinder 22, telescoping cylinder 31, rotation motor 21 and swing motor 41 are controlled in accordance with the directions and amounts of operation on operation levers 43 to 46 provided inside an operating box 42 to be described later.

As shown in FIGS. 1 and 2, the workbench 40 is provided thereon with the operating box 42 having a variety of operation means. The operating box 42 is provided with the derrick operation lever 43 for derricking the boom 30, telescoping operation lever 44 for telescoping the boom 30, rotation operation lever 45 for rotating the rotating structure 20, and swing operation lever 46 for swinging the workbench 40. Each of the operation levers 43 to 46 can be operated to lean forwardly and backwardly from a neutral position which is a vertical position and is configured to return to the neutral position automatically by means of a built-in spring when the operation lever in a leant position is freed from the operator's hand. When each of the operation levers 43 to 46 is operated, voltage signals corresponding to the operating direction (leaning direction) and operating amount (leaning amount) relative to the neutral position serving as a datum are outputted and then each inputted as a boom operation signal to a boom operation control section 60a of a controller 60.

The boom operation control section 60a controls the amounts of hydraulic fluid to be supplied from the hydraulic pump 70 to the cylinders 22 and 31 and motors 21 and 41 by electromagnetically driving the spools of the control valves 71 to 74 correspondingly to the directions and amounts according to the boom operation signals inputted, thereby controlling the directions and amounts of operations of the cylinders 22 and 31 and motors 21 and 41. The boom operation control section 60a also controls electric power to be supplied from the battery 90 to the pump driving motor 75 through the boom actuating inverter 76 in accordance with the boom operation signals inputted, thereby controlling the amounts of hydraulic fluid to be delivered from the hydraulic pump 70. Therefore, an operator M on the workbench 40 operates the operation levers 43 to 46 to derrick and telescope the boom 30, rotate the rotating structure 20 in the horizontal plane and swing the workbench 40, thereby making it possible to move the workbench 40 to a desired high place.

The voltage level of each of the boom operation signals outputted by operating the operation levers 43 to 46 is substantially proportional to the amount of operation on the associated operation lever and, hence, the operating velocities of the cylinders 22 and 31 and motors 21 and 41 can be adjusted by adjusting the amounts of operation on the operation levers 43 to 46. Such operation levers 43 to 46 are also provided on the rotating structure 20 and, hence, an operator on the rotating structure 20 can also actuate the boom 30, rotating structure 20 and workbench 40.

Figure 3:
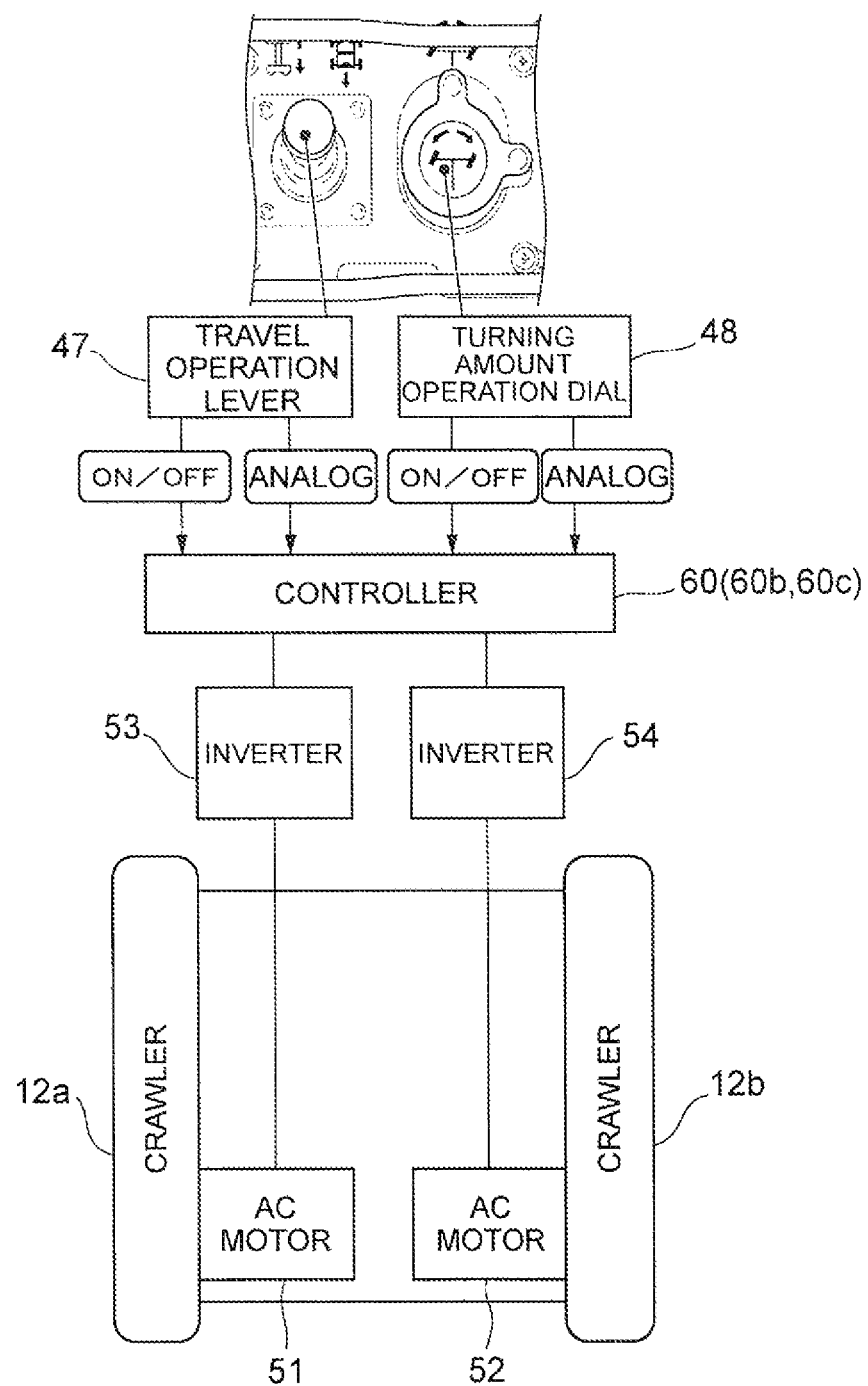
FIG. 3 is a control system diagram of transversely opposite crawler travel devices provided on the crawler-type high place work vehicle.

The operating box 42 is provided with the travel operation lever 47 and turning amount operation dial 48 for travel operation over the transversely opposite crawler travel devices 12a and 12b. As shown in FIG. 3, the travel operation lever 47 can be operated to lean forwardly and backwardly from a neutral position which is a vertical position and is configured to return to the neutral position automatically by means of a built-in spring when the travel operation lever 47 in a leant position is freed from the operator's hand. When the travel operation lever 47 is operated to lean, voltage signals corresponding to the operating direction (leaning direction) and operating amount (leaning amount) relative to the neutral position serving as a datum are outputted and then inputted as travel command signals to a travel control section 60b of the controller 60. The operation to lean the travel operation lever 47 forwardly from the neutral position corresponds to a forward travel command for the transversely opposite crawler travel devices 12a and 12b. As the leaning amount of leaning operation becomes larger, a larger value is set as a target traveling velocity of forward travel by the travel control section 60b. The operation to lean the travel operation lever 47 backwardly from the neutral position corresponds to a backward travel command for the transversely opposite crawler travel devices 12a and 12b. As the amount of leaning operation becomes larger, a larger value is set as a target traveling velocity of backward travel by the travel control section 60b. The operation to return the travel operation lever 47 to the neutral position corresponds to a stop command for the transversely opposite crawler travel devices 12a and 12b.

The turning amount operation dial 48 can be operated to turn rightwardly and leftwardly from the neutral position (the position shown in FIG. 3) and is configured to return to the neutral position automatically by means of a built-in spring when the turning amount operation dial 48 in a turned position is freed from the operator's hand. When the turning amount operation dial 48 is operated to turn, voltage signals corresponding to the operating direction (turning direction) and operating amount (turning amount) relative to the neutral position serving as a datum are outputted and then inputted as turning amount command signals to the travel control section 60b. The operation to turn the turning amount operation dial 48 rightwardly from the neutral position corresponds to a rightward turn command for the transversely opposite crawler travel devices 12a and 12b. As the amount of rightwardly turning operation from the neutral position becomes larger, a larger value is set as a target rightward turning amount by the travel control section 60b. The operation to turn the turning amount operation dial 48 leftwardly from the neutral position corresponds to a leftward turn command for the transversely opposite crawler travel devices 12a and 12b. As the leftward turning amount from the neutral position becomes larger, a larger value is set as a target leftward turning amount by the travel control section 60b. The operation to return the turning amount operation dial 48 to the neutral position corresponds to a command to zero the turning amount for the transversely opposite crawler travel devices 12a and 12b (straight travel command).

In response to input of the travel command signals (corresponding to the operating direction and amount from the neutral position serving as a datum) from the travel operation lever 47, the travel control section 60b of the controller 60 sets a target straight traveling velocity of the transversely opposite crawler travel devices 12a and 12b according to the travel command signals and controls the revolution velocities of the transversely opposite travel motors 51 and 52 by controlling electric power to be supplied to the transversely opposite travel motors 51 and 52 such that the traveling velocities of both of the transversely opposite crawler travel devices 12a and 12b follow the target straight traveling velocity.

In response to input of the turning amount command signals (corresponding to the operating direction and amount from the neutral position serving as a datum) from the turning amount operation dial 48, the travel control section 60b sets target turning velocities of the respective transversely opposite crawler travel devices 12a and 12b according to the turning amount command signals, and then controls the revolution velocities of the transversely opposite travel motors 51 and 52 by controlling electric power to be supplied to the transversely opposite travel motors 51 and 52 such that the traveling velocities of the transversely opposite crawler travel devices 12a and 12b follow their respective target turning velocities. Specifically, the revolution velocities of the transversely opposite travel motors 51 and 52 are controlled such that the transversely opposite crawler travel devices 12a and 12b are caused to turn according to the turning amount command signals, which are made by decelerating the traveling velocities of the transversely opposite crawler travel devices 12a and 12b from the target straight traveling velocity set by the travel operation lever 47 by equal values of velocity which are predetermined in accordance with the turning amount command signals inputted from the turning amount operation dial 48, the turning amount command signals being further made by decelerating the traveling velocity of one of the crawler travel device 12a and 12b which is positioned inwardly relative to the other in the turning direction.

Figure 4A:
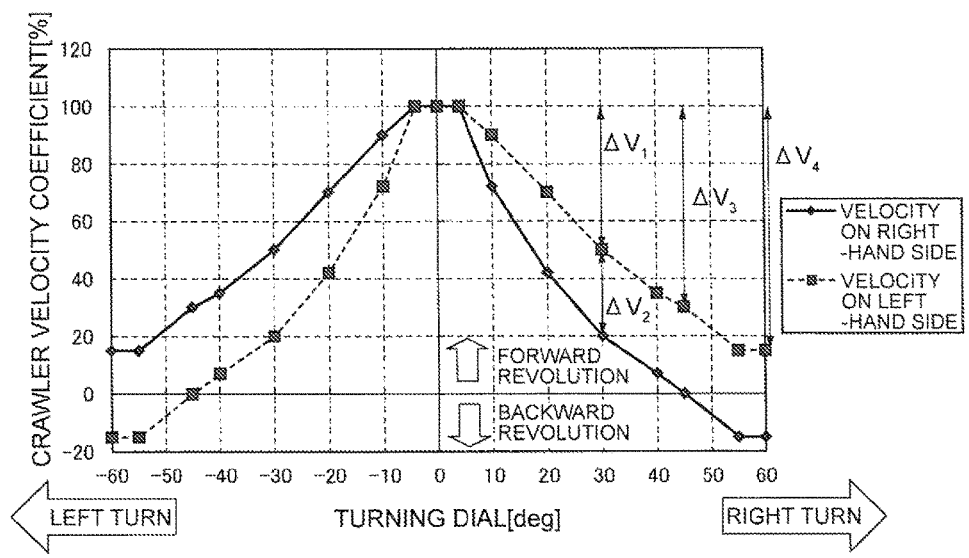
FIG. 4A and FIG. 4B are graphs illustrating the relationship between the amount of operation on a turning amount operation dial and the traveling velocities of the transversely opposite crawler travel devices; specifically.

FIG. 4A illustrates a case where the travel operation lever 47 is operated to lean forwardly from the neutral position by an operating amount of 100% (maximum). Initially, when the amount of turning operation on the turning amount operation dial 48 is 0 degrees (neutral position), the revolution velocities of the transversely travel motors 51 and 52 are controlled to cause the traveling velocities of both of the transversely opposite crawler travel devices 12a and 12b to follow the target straight traveling velocity V×100%, thereby causing the crawler travel member 10 to travel forwardly. When the turning amount operation dial 48 is turned rightwardly by 30 degrees for example from the neutral position during straight travel of the crawler travel member 10 (i.e., transversely opposite crawler travel devices 12a and 12b) at the traveling velocity V×100%, the left-hand crawler travel device 12a which is positioned outwardly relative to the other in the turning direction is decelerated by $\Delta V_1$, while the right-hand crawler travel device 12b which is positioned inwardly relative to the other in the turning direction is decelerated by $\Delta V_1+\Delta V_2$. Stated otherwise, the revolution velocity of the left-hand travel motor 51 is controlled to cause the traveling velocity of the outwardly positioned left-hand crawler travel device 12a to follow the target turning velocity V×100%–$\Delta V_1$, while the revolution velocity of the right-hand travel motor 52 is controlled to cause the traveling velocity of the inwardly positioned right-hand crawler travel device 12b to follow the target turning velocity V×100%–($\Delta V_1+\Delta V_2$). By so controlling, the crawler travel member 10 is caused to turn rightwardly (in a slalom turn fashion) correspondingly to the amount of 30 degrees of turning operation on the turning amount operation dial 48. That is, both of the crawler travel devices 12a and 12b are decelerated by $\Delta V_1$ to improve the turning stability, while the inwardly positioned right-hand crawler travel device 12b is further decelerated from the thus decelerated velocity by $\Delta V_2$ to realize the turn corresponding to the amount of operation on the turning amount operation dial 48.

Subsequently, when the turning amount operation dial 48 is turned rightwardly by 45 degrees from the neutral position, the revolution velocity of the left-hand travel motor 51 is controlled to cause the traveling velocity of the left-hand crawler travel device 12a positioned outwardly relative to the other to follow a target turning velocity V×100%–$\Delta V_3$ ($\Delta V_3>\Delta V_1$), while the right-hand travel motor 52 is controlled to cause the right-hand crawler travel device 12b positioned inwardly relative to the other to stop. By so controlling, the crawler travel member 10 is caused to turn rightwardly in a pivot turn fashion (turn about the center of the right-hand crawler travel device 12b serving as the center of turning). Further, when the turning amount operation dial 48 is turned rightwardly by 60 degrees from the neutral position, the revolution velocity of the left-hand travel motor 51 is controlled to cause the traveling velocity of the left-hand crawler travel device 12a positioned outwardly relative to the other to follow a target turning velocity V×100%–$\Delta V_4$ ($\Delta V_4>\Delta V_3$), while the right-hand travel motor 52 is controlled to cause the right-hand crawler travel device 12b positioned inwardly relative to the other to turn in the opposite direction at a target turning velocity V×100%–$\Delta V_4$. By so controlling, the crawler travel member 10 is caused to turn rightwardly in a spin turn fashion (turn about the center of the crawler travel member 10 serving as the center of turning).

During such a turn, the inwardly positioned right-hand crawler travel device 12b is sometimes driven by the outwardly positioned left-hand crawler travel device 12a. (Such a phenomenon sometimes occurs during a gentle slalom turn.) By utilizing the driving force produced at that time, the right-hand travel motor 52 generates electric power which charges the battery 90 through the right-hand inverter 54 for travel.

Figure 4B:
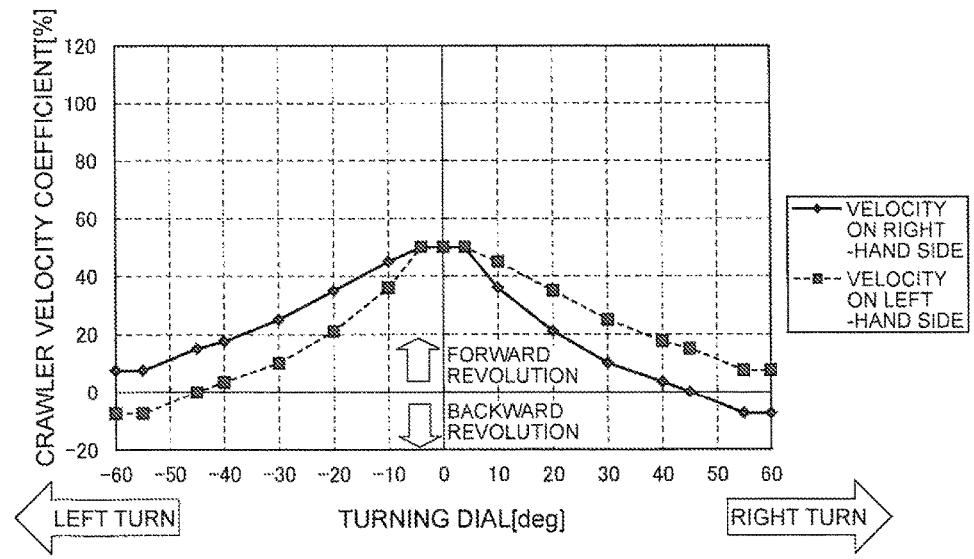

A control performed when the turning amount operation dial 48 is turned leftwardly from the neutral position is the same as the travel control described above except that that device of the crawler travel devices 12a and 12b which is positioned inwardly relative to the other in the turning direction and that device of the crawler travel devices 12a and 12b which is positioned outwardly relative to the other in the turning direction are reversed. FIG. 4B illustrates a case when the travel operation lever 47 is operated to lean forwardly from the neutral position by an amount of operation of 50%. The travel control performed in this case is the same as the travel control described above except that the target values are varied. The travel control section 60b of the controller 60 has previously established therein information on target values for turning in accordance with the amounts of operation on the travel operation lever 47.

As shown in FIGS. 1 and 2, the crawler-type high place work vehicle 1 is provided with a derricking angle detector 81 configured to detect the derricking angle of the boom 30 from a horizontal position, a length detector 82 configured to detect the length of the boom 30, and a turning angle detector 83 configured to detect the turning angle of the boom 30 (rotating structure 20). Information on the derricking angle, length and turning angle of the boom 30 detected by these detectors 81 to 83 is inputted to a determination section 60c of the controller 60.

The determination section 60c calculates the position of the workbench 40 relative to the crawler travel member 10 based on the information on the derricking angle, length and turning angle of the boom 30 inputted thereto from the detectors 81 to 83. Subsequently, the determination section 60c determines whether or not the position of the workbench 40 is horizontally separated from the crawler travel member 10 by a distance in excess of a predetermined allowable horizontal distance. When determination is made that the position of the workbench 40 is in excess of the allowable horizontal distance, the determination section 60c outputs a first restrictive signal to the travel control section 60b. In response to input of the first restrictive signal from the determination section 60c, the travel control section 60b performs a control such that when the turning amount command signals are inputted from the turning amount operation dial 48, the amounts of deceleration of the traveling velocities of the transversely opposite crawler travel devices 12a and 12b from the target straight traveling velocity set by the travel operation lever 47 are made larger than when the first restrictive signal is not inputted (when the position of the workbench 40 is not in excess of the allowable horizontal distance), thereby causing the crawler travel member 10 to turn.

The travel control section 60b may be configured to perform a control such that when the turning amount command signals are inputted from the turning amount operation dial 48, the amounts of deceleration of the traveling velocities of the transversely opposite crawler travel devices 12a and 12b from the target straight traveling velocity set by the travel operation lever 47 become larger in accordance with the horizontal distance between the workbench 40 and the crawler travel member 10 calculated by the determination section 60c (a control for causing the amounts of deceleration to vary linearly in accordance with the horizontal distance). The travel control section 60b may be configured to establish a restrictive target velocity which is lower than the target straight traveling velocity corresponding to the amount of operation on the travel operation lever 47 in accordance with the horizontal distance between the workbench 40 and the crawler travel member 10 calculated by the determination section 60c (establish a restrictive target velocity linearly varying with the horizontal direction) when the travel command signals are inputted from the travel operation lever 47 and then perform a control for causing the traveling velocities of the transversely opposite travel motors 51 and 52 to follow the restrictive target velocity thus established.

Figure 5:
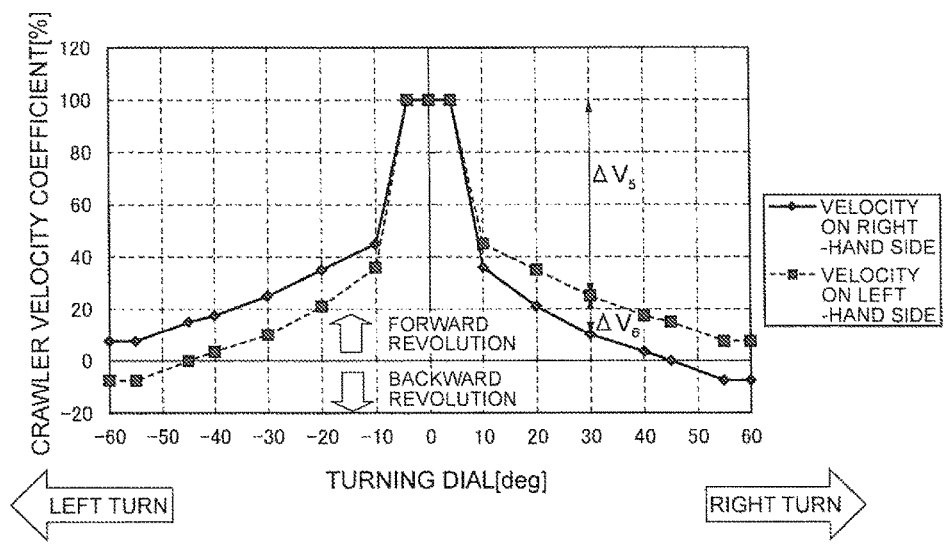
FIG. 5 is a graph illustrating the relationship obtained between the amount of operation on the turning amount operation dial and the traveling velocities of the transversely opposite crawler travel devices when the position of a workbench is in excess of an allowable horizontal distance.

FIG. 5 illustrates a case where the travel operation lever 47 is operated to lean forwardly from the neutral position by an amount of operation of 100% (maximum) when the position of the workbench 40 is in excess of the allowable horizontal distance (but not in excess of an allowable vertical distance to be described later). Initially, when the amount of turning operation on the turning amount operation dial 48 is 0 degrees (neutral position), the revolution velocities of the transversely opposite travel motors 51 and 52 are controlled to cause the traveling velocities of both of the transversely opposite crawler travel devices 12a and 12b to follow the target straight traveling velocity V×100%, thereby causing the crawler travel member 10 to travel forwardly. Although the control for straight travel performed in this case remains the same as when the position of the workbench 40 is not in excess of the allowable horizontal distance, a control may be performed such that the traveling velocity of straight travel is set to a smaller value. On the other hand, when the turning amount operation dial 48 is turned rightwardly by 30 degrees for example from the neutral position during straight travel of the crawler travel member 10 (i.e., transversely opposite crawler travel devices 12a and 12b) at the traveling velocity V×100%, the traveling velocity of the left-hand crawler travel device 12a which is positioned outwardly relative to the other in the turning direction is decelerated by $\Delta V_5$, while the traveling velocity of the right-hand crawler travel device 12b which is positioned inwardly relative to the other in the turning direction is decelerated by $\Delta V_5+\Delta V_6$. That is, the revolution velocity of the left-hand travel motor 51 is controlled to cause the traveling velocity of the left-hand crawler travel device 12a positioned outwardly relative to the other to follow the target turning velocity V×100%−$\Delta V_5$, while the revolution velocity of the right-hand travel motor 52 is controlled to cause the traveling velocity of the right-hand crawler travel device 12b positioned inwardly relative to the other to follow the target turning velocity V×100%−($\Delta V_5+\Delta V_6$). By so controlling, the crawler travel member 10 is caused to turn rightwardly (in a slalom turn fashion) correspondingly to the amount of 30 degrees of turning operation on the turning amount operation dial 48. Here, $\Delta V_5$ is a larger value than $\Delta V_1$ shown in FIG. 4A and, hence, the amounts of deceleration of both of the transversely opposite crawler travel devices 12a and 12b become larger. That is, when the position of the workbench 40 is in excess of the allowable horizontal distance, a control is performed such that the turning velocities are reduced to lower values than when the position of the workbench 40 is not in excess of the allowable horizontal distance.

The determination section 60c determines whether or not the position of the workbench 40 is separated upwardly from the crawler travel member 10 by a distance in excess of a predetermined allowable vertical distance (allowable height). When determination is made that the position of the workbench 40 is in excess of the allowable vertical distance, the determination section 60c outputs a second restrictive signal to the travel control section 60b. In response to input of the second restrictive signal from the determination section 60c, the travel control section 60b establishes a restrictive target velocity which is lower than the target straight traveling velocity according to the travel command signals when the travel command signals are inputted from the travel operation lever 47 and then controls the revolution velocities of the transversely opposite travel motors 51 and 52 to cause the traveling velocities of both of the transversely opposite crawler travel devices 12a and 12b to follow the restrictive target velocity thus established, thereby causing the crawler travel member 10 to travel straight.

The travel control section 60b may be configured to establish a restrictive target velocity which is lower than the target straight traveling velocity corresponding to the amount of operation on the travel operation lever 47 in accordance with the vertical distance between the workbench 40 and the crawler travel member 10 calculated by the determination section 60c (establish the restrictive target velocity varying linearly with the vertical distance) when the travel command signals are inputted from the travel operation lever 47 and then perform a control for causing the traveling velocities of the transversely opposite travel motors 51 and 52 to follow the restrictive target velocity thus established. Further, the travel control section 60b may be configured to perform a control such that when the turning amount command signals are inputted from the turning amount operation dial 48, the amounts of deceleration of the traveling velocity of the transversely opposite crawler travel devices 12a and 12b from the target straight traveling velocity set by the travel operation lever 47 become larger in accordance with the vertical distance between the workbench 40 and the crawler travel member 10 calculated by the determination section 60c (a control for causing the amounts of deceleration to vary linearly with the vertical distance).

Figure 6:
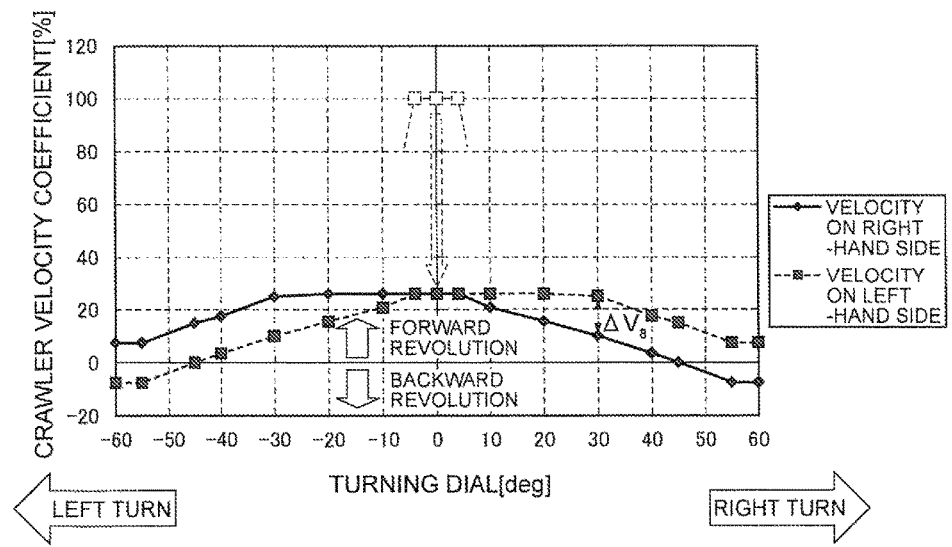
FIG. 6 is a graph illustrating the relationship obtained between the amount of operation on the turning amount operation dial and the traveling velocities of the transversely opposite crawler travel devices when the position of the workbench is in excess of an allowable vertical distance.

FIG. 6 illustrates a case where the travel operation lever 47 is operated to lean forwardly from the neutral position by an amount of operation of 100% (maximum) when the position of the workbench 40 is in excess of the allowable vertical distance (but not in excess of the allowable horizontal distance). Initially, when the amount of turning operation on the turning amount operation dial 48 is 0 degrees (neutral position), the revolution velocities of the transversely opposite travel motors 51 and 52 are controlled to cause the traveling velocities of both of the transversely opposite crawler travel devices 12a and 12b to follow a restrictive target velocity V×about 25% which is lower than the target straight traveling velocity V×100% according to the travel command signals inputted from the travel operation lever 47, thereby causing the crawler travel member 10 to travel forwardly. That is, when the position of the workbench 40 is in excess of the allowable vertical distance, a control is performed such that the straight traveling velocity is set to a smaller value than when the position of the workbench 40 is not in excess of the allowable vertical distance. Subsequently, when the turning amount operation dial 48 is turned rightwardly by 30 degrees for example from the neutral position during straight travel of the crawler travel member 10 (i.e., transversely opposite crawler travel devices 12a and 12b) at the traveling velocity V×about 25%, the traveling velocity of the left-hand crawler travel device 12a which is positioned outwardly relative to the other in the turning direction is decelerated by $\Delta V_7$ ($\Delta V_7$ is not shown because the value thereof is small), while the traveling velocity of the right-hand crawler travel device 12b which is positioned inwardly relative to the other in the turning direction is decelerated by $\Delta V_7+\Delta V_8$. That is, the revolution velocity of the left-hand travel motor 51 is controlled to cause the traveling velocity of the outwardly positioned left-hand crawler travel device 12a to follow the target turning velocity V×about 25%−$\Delta V_7$, while the revolution velocity of the right-hand travel motor 52 is controlled to cause the traveling velocity of the inwardly positioned right-hand crawler travel device 12b to follow the target turning velocity V×about 25%−(ΔV₇+ΔV₈). By so controlling, the crawler travel member 10 is caused to turn rightwardly (in a slalom turn fashion) correspondingly to the amount of 30 degrees of turning operation on the turning amount operation dial 48.

When the position of the workbench 40 is in excess of both the allowable horizontal distance and the allowable vertical distance (when both of the first and second restrictive signals are inputted from the determination section 60c), the travel control section 60b performs a control such that the control performed when the position of the workbench 40 is in excess of the allowable horizontal distance is performed, while the control performed when the position of the workbench 40 is in excess of the allowable vertical distance is added as a correction value to the former control. That is, a control is performed such that both of the turning velocity and the straight traveling velocity are set to smaller values than when the position of the workbench 40 is in excess of neither the allowable horizontal distance nor the allowable vertical distance.

In the crawler-type high place work vehicle 1, the travel control section 60b is configured to control the revolution velocities of the transversely opposite travel motors 51 and 52 such that when the turning amount command signals are inputted from the turning amount operation dial 48, the transversely opposite crawler travel devices 12a and 12b are caused to turn according to the turning amount command signals by decelerating the transversely opposite crawler travel devices 12a and 12b from the target straight traveling velocity set by the travel operation lever 47 by equal values of velocity which are predetermined according to the turning amount command signals inputted from the turning amount operation dial 48 and further decelerating the traveling velocity of the crawler travel device 12a or 12b which is positioned inwardly relative to the other in the turning direction. This configuration can reduce the inertial force (centrifugal force) to be exerted on the vehicle and rider to a small value though the turning velocity is lower than that under the conventional travel control which realizes a turn by decelerating only the inwardly positioned crawler travel device. Therefore, the traveling stability of the vehicle during turning and the ride quality felt by the rider during turning can be improved.

In the crawler-type high place work vehicle 1, the travel control section 60b is configured to cause the crawler travel member 10 to turn by performing the control such that when the turning amount command signals are inputted from the turning amount operation dial 48, the amounts of deceleration of the traveling velocities of the transversely opposite crawler travel devices 12a and 12b from the target straight traveling velocity set by the travel operation lever 47 become larger in accordance with the horizontal distance between the workbench 40 and the crawler travel member 10. Since a larger inertial force is exerted on the workbench 40 during turning as the workbench 40 becomes more separated horizontally from the crawler travel member 10, the configuration described above can prevent the rider on the workbench 40 from being subjected to an excessive inertial force during turning, thereby improving the safety of the rider on the workbench 40.

In the crawler-type high place work vehicle 1, the travel control section 60b is configured to establish a restrictive target velocity which is lower than the target straight traveling velocity corresponding to the amount of operation on the travel operation lever 47 in accordance with the vertical distance between the workbench 40 and the crawler travel member 10 when the travel command signals are inputted from the travel operation lever 47 and then control the revolution velocities of the transversely opposite travel motors 51 and 52 to cause the traveling velocities of the transversely opposite crawler travel devices 12a and 12b to follow the restrictive target velocity thus established, thereby causing the crawler travel member 10 to travel straight. Since the traveling stability of the vehicle during straight travel lowers as the workbench 40 becomes more separated upwardly from the crawler travel member 10, the configuration described above can improve the traveling stability of the vehicle during straight travel. The travel control section 60b may be configured to cause the crawler travel member 10 to turn by performing a control such that the amounts of deceleration of the traveling velocities of the transversely opposite crawler travel devices 12a and 12b from the target straight traveling velocity set by the travel operation lever 47 become larger in accordance with the vertical distance between the workbench 40 and the crawler travel member 10. This configuration can improve the traveling stability of the vehicle during turning.

The crawler-type high place work vehicle 1 is configured such that during turning, a driving force that is produced when that crawler travel device which is positioned inwardly relative to the other in the turning direction is driven by that crawler travel device which is positioned outwardly relative to the other in the turning direction is utilized to generate electric power which charges the battery 90 by that travel electric motor which drives the inwardly positioned crawler travel device. For this reason, it is possible to prolong the serviceable life of the battery 90, thereby to realize energy saving.

While the embodiment according to the present invention has been described above, the scope of the present invention is not limited to the embodiment. For example, though the transversely opposite crawler travel devices 12a and 12b of the foregoing embodiment are configured to be driven by the respective electric motors (i.e., travel motors 51 and 52), the transversely opposite crawler travel devices may be configured to be driven by respective hydraulic motors. In cases where such hydraulic motors are used, the inverters 53 and 54 for travel shown in FIG. 2 are each replaced with a proportional valve for travel, while the number of revolutions of each hydraulic motor is controlled by controlling the amount of spool movement (the ratio of opening) of the proportional valve.

In the foregoing embodiment, the travel operation device includes the travel operation lever 47 and the turning amount operation dial 48. However, the travel operation device may be either a travel operation device provided with an accelerator pedal for setting a traveling velocity and a steering wheel for setting a turning direction and turning amount or a joystick-type travel operation device which is capable of setting a forward travel, backward travel, traveling velocity, turning direction and turning amount by means of a single travel operation lever. The foregoing embodiment includes the rotating structure 20, boom 30 and workbench 40 which are provided on the crawler travel member 10. However, the present invention is also applicable to a crawler-type travel vehicle provided with, for example, a high place work device of the vertical mast lift type or scissor lift type, a crane device, and the like which are mounted on the crawler travel member 10.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A traveling vehicle comprising:
a vehicle body;
left and right crawler travel devices, which are provided on left and right sides of the vehicle body and are configured to be driven by left and right travel motors respectively;
a single travel operation device, which is configured to be operated by an operator to output traveling operational instruction signals of a forward-reverse traveling direction, and a forward-reverse traveling velocity of the traveling vehicle in response to an operation of the single travel operation device;
a single turning operation device, which is configured to be operated by the operator to output turning operational instruction signals of a turning direction and a turning degree for turning travel of the traveling vehicle in response to operation of the single turning operation device; and
a travel control device configured to control a direction and velocity of rotation of each of the left and right travel motors in response to the traveling operational instruction signals from the single travel operation device and turning operational instruction signals from the single turning operation device; wherein,
when the single travel operation device is operated while the single turning operation device is not operated, the travel control device controls the direction and velocity of rotation of the left and right travel motors in response to the traveling operational instruction signals so as to let both the left and right crawler travel devices drive forward or reverse with a certain traveling velocity V to let the traveling vehicle travel forward or reverse straightly with the certain traveling velocity V; and
when the single turning operation device is operated while the single travel operation device is being operated, the travel control device controls the direction and velocity of rotation of the left and right travel motors in response to the traveling operational instruction signals and the turning operational instruction signals so as to decrease traveling velocities of both the left and right crawler travel devices by a first amount ΔV1, which is determined in correspondence with the turning operational instruction signal from the single turning operation device, and further to decrease a traveling velocity of one of the left and right crawler travel devices which is positioned inwardly relative to the other of the left and right crawler travel devices in the turning direction by an additional second amount ΔV2 required to make a turn of the traveling vehicle corresponding to the turning operational instruction signals from the single turning operation device; and,
the traveling vehicle further comprising:
a lifting device, which is mounted on the vehicle body and which at least is used to move a workbench up and down; and
a workbench-position detecting device, which is configured to detect a position of the workbench relative to the vehicle body; wherein,
when the single travel operation device is operated while the single turning operation device is not operated, the travel control device varies the velocity of rotation of the left and right travel motors in response to a height position of the workbench detected by the workbench-position detecting device so as to change the certain traveling velocity V.

2. A traveling vehicle comprising:
a vehicle body;
left and right crawler travel devices, which are provided on left and right sides of the vehicle body and are configured to be driven by left and right travel motors respectively;
a single travel operation device, which is configured to be operated by an operator to output traveling operational instruction signals of a forward-reverse traveling direction, and a forward-reverse traveling velocity of the traveling vehicle in response to an operation of the single travel operation device;
a single turning operation device, which is configured to be operated by the operator to output turning operational instruction signals of a turning direction and a turning degree for turning travel of the traveling vehicle in response to operation of the single turning operation device; and
a travel control device configured to control a direction and velocity of rotation of each of the left and right travel motors in response to the traveling operational instruction signals from the single travel operation device and turning operational instruction signals from the single turning operation device; wherein,
when the single travel operation device is operated while the single turning operation device is not operated, the travel control device controls the direction and velocity of rotation of the left and right travel motors in response to the traveling operational instruction signals so as to let both the left and right crawler travel devices drive forward or reverse with a certain traveling velocity V to let the traveling vehicle travel forward or reverse straightly with the certain traveling velocity V; and
when the single turning operation device is operated while the single travel operation device is being operated, the travel control device controls the direction and velocity of rotation of the left and right travel motors in response to the traveling operational instruction signals and the turning operational instruction signals so as to decrease traveling velocities of both the left and right crawler travel devices by a first amount ΔV1, which is determined in correspondence with the turning operational instruction signal from the single turning operation device, and further to decrease a traveling velocity of one of the left and right crawler travel devices which is positioned inwardly relative to the other of the left and right crawler travel devices in the turning direction by an additional second amount ΔV2 required to make a turn of the traveling vehicle corresponding to the turning operational instruction signals from the single turning operation device; and,
the traveling vehicle further comprising:
a lifting device, which is mounted on the vehicle body and which at least is used to move a workbench up and down; and
a workbench-position detecting device, which is configured to detect a position of the workbench relative to the vehicle body; wherein,
when the single turning operation device is operated while the single travel operation device is being operated, the travel control device varies the first amount ΔV1 and the second amount ΔV2 in response to a height position of the workbench detected by the workbench-position detecting device.

3. A traveling vehicle comprising:
a vehicle body;
left and right crawler travel devices, which are provided on left and right sides of the vehicle body and are configured to be driven by left and right travel motors respectively;
a single travel operation device, which is configured to be operated by an operator to output traveling operational instruction signals of a forward-reverse traveling direction, and a forward-reverse traveling velocity of the traveling vehicle in response to an operation of the single travel operation device;
a single turning operation device, which is configured to be operated by the operator to output turning operational instruction signals of a turning direction and a turning degree for turning travel of the traveling vehicle in response to operation of the single turning operation device; and
a travel control device configured to control a direction and velocity of rotation of each of the left and right travel motors in response to the traveling operational instruction signals from the single travel operation device and turning operational instruction signals from the single turning operation device; wherein,
when the single travel operation device is operated while the single turning operation device is not operated, the travel control device controls the direction and velocity of rotation of the left and right travel motors in response to the traveling operational instruction signals so as to let both the left and right crawler travel devices drive forward or reverse with a certain traveling velocity V to let the traveling vehicle travel forward or reverse straightly with the certain traveling velocity V; and
when the single turning operation device is operated while the single travel operation device is being operated, the travel control device controls the direction and velocity of rotation of the left and right travel motors in response to the traveling operational instruction signals and the turning operational instruction signals so as to decrease traveling velocities of both the left and right crawler travel devices by a first amount $\Delta V1$, which is determined in correspondence with the turning operational instruction signal from the single turning operation device, and further to decrease a traveling velocity of one of the left and right crawler travel devices which is positioned inwardly relative to the other of the left and right crawler travel devices in the turning direction by an additional second amount $\Delta V2$ required to make a turn of the traveling vehicle corresponding to the turning operational instruction signals from the single turning operation device; and,
the traveling vehicle further comprising:
a lifting device, which includes a boom mounted on the vehicle body and capable of derricking, telescoping and pivoting, and which is used to move up and down a workbench attached to a distal end portion of the boom; and
a workbench-position detecting device, which is configured to detect a position of the workbench relative to the vehicle body; wherein,
when the single turning operation device is operated while the single travel operation device is being operated, the travel control device varies the first amount $\Delta V1$ and the second amount $\Delta V2$ in response to a horizontal position of the workbench detected by the workbench-position detecting device.

4. The traveling vehicle according to any one of claims 1, 2, and 3, in which
the left and right travel motors are electric motors;
the left and right travel electric motors have a function of generating electric power when driven to rotate; and
when the single travel operation device is being operated and the single turning operation device is also operated to make a turn of the traveling vehicle, traveling velocity of one of the left and right crawler travel devices, which is positioned inwardly in the turning direction, is decreased by decreasing velocity of rotation of one of the travel motors for the one of the left and right crawler travel devices by which the one of the travel motors generates electricity.

* * * * *